Oct. 20, 1959      O. J. MELLAND      2,909,022
ROTARY PNEUMATIC HARVESTER REEL
Filed Jan. 21, 1958      2 Sheets-Sheet 1
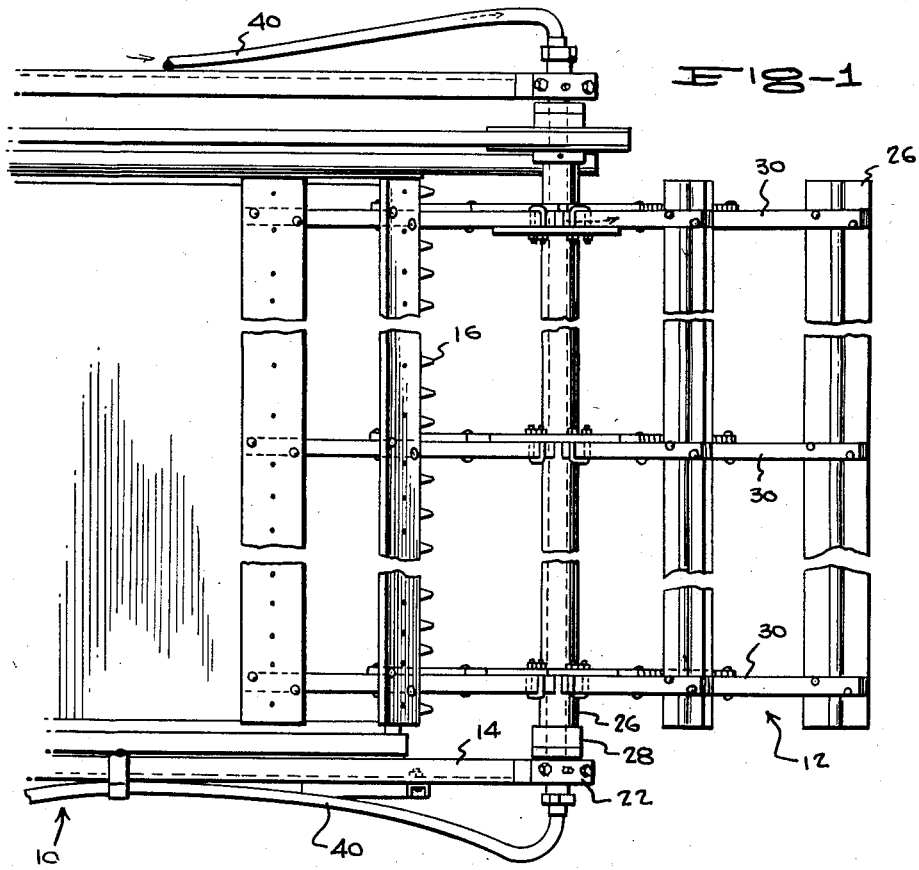
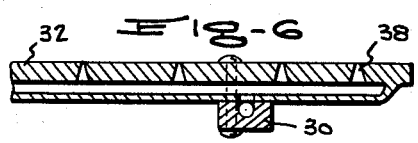
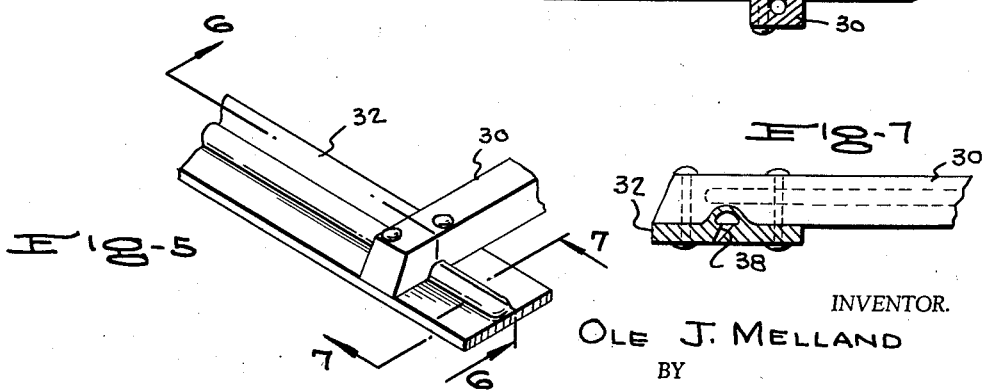
INVENTOR.
OLE J. MELLAND
BY
McMorrow, Berman & Davidson
ATTORNEYS

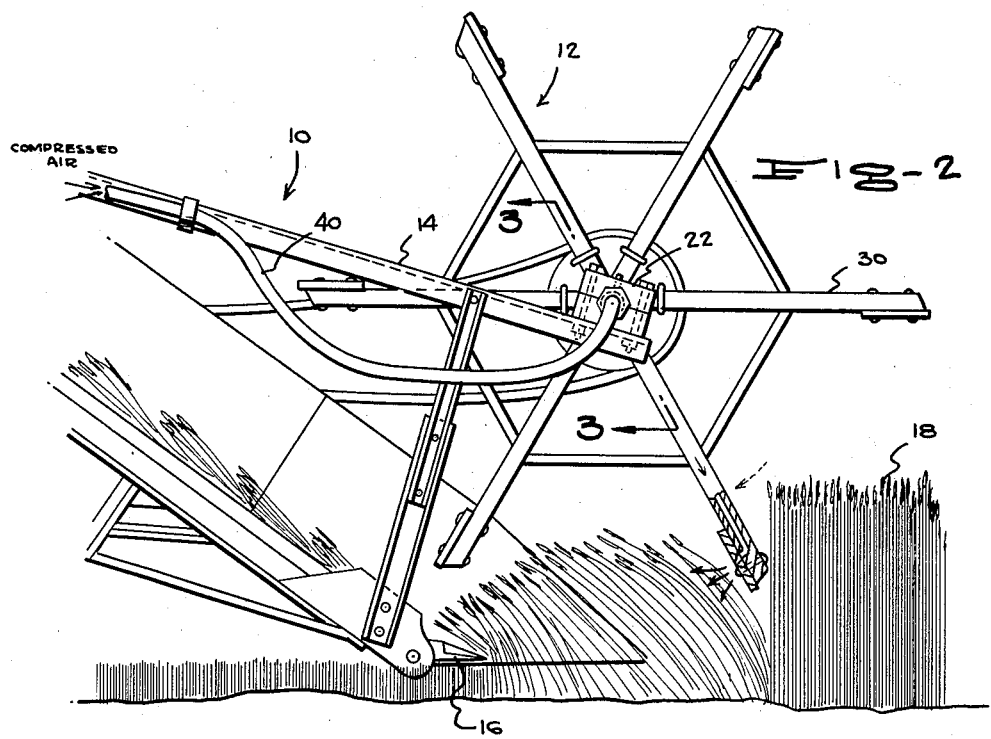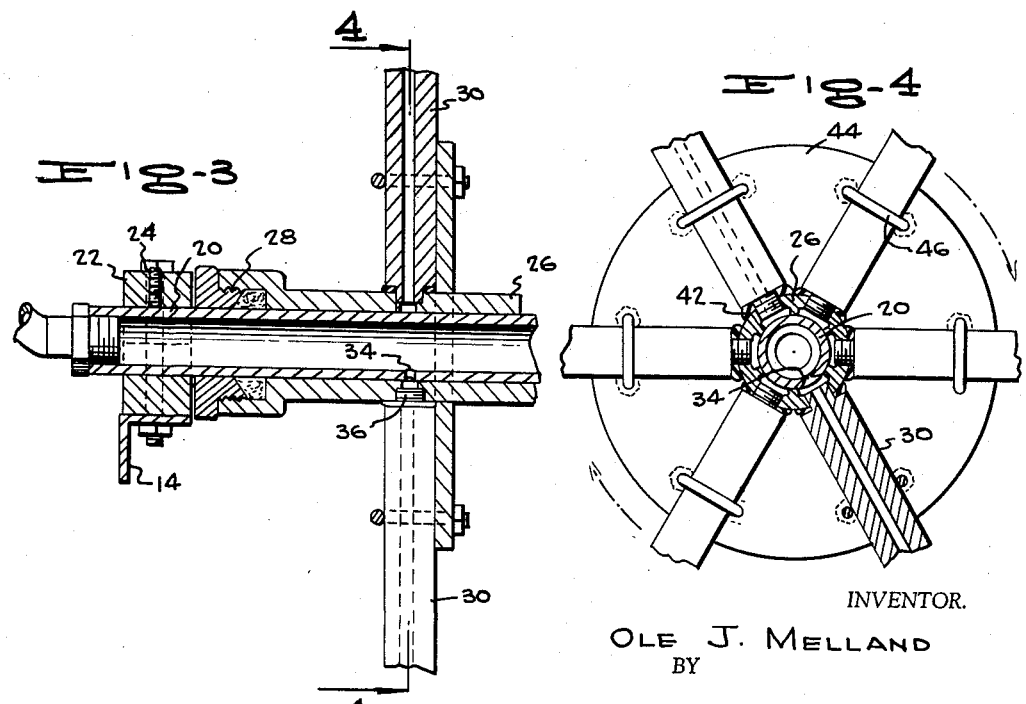

2,909,022
ROTARY PNEUMATIC HARVESTER REEL
Ole John Melland, Sidney, Mont.
Application January 21, 1958, Serial No. 710,349
1 Claim. (Cl. 56—220)

The present invention relates to harvesters and in particular to a pneumatic reel for a harvester.

An object of the present invention is to provide a reel for a harvester which lends itself to the saving of grain previously lost when the grain stalks are shorter than normal.

Another object of the present invention is to provide a reel for a harvester having pneumatic means for blowing the grain stalks in the direction toward the header, and one which may be operated in the conventional manner without such pneumatic means when desired.

A further object of the present invention is to provide a reel for a harvester which is sturdy in construction, one simple in structure, one economically feasible, and one highly effective in action.

These and other objects and advantages of the present invention will be fully apparent from the following description when taken in conjunction with the annexed drawings, in which:

Figure 1 is a plan view of the forward portion of a harvester header, showing the reel of the present invention installed thereon;

Figure 2 is a side elevational view of the assembly shown in Figure 1;

Figure 3 is a sectional view, on an enlarged scale, taken on the line 3—3 of Figure 2;

Figure 4 is a fragmentary view partially in section taken on the line 4—4 of Figure 3;

Figure 5 is a fragmentary isometric view of a portion of one of the spokes and a portion of the attached beater bar;

Figure 6 is a sectional view taken on the line 6—6 of Figure 5; and

Figure 7 is a view taken on the line 7—7 of Figure 5.

Referring in greater detail to the drawings in which like numerals indicate like parts throughout the several views, the reference numeral 10 designates the header portion of a harvester and the reference numeral 12 designates generally the reel of the present invention installed upon the harvester header 10. The harvester includes a mobile frame 14 mounted upon wheels (not shown) for movement over a ground surface and a cutter assembly 16 carried by the frame 14 at a level above the ground surface for cutting standing grain as at 18 in Figure 2.

The reel 12 of the present invention comprises a hollow fixed shaft 20 arranged forwardly of and above and extending from one end to the other end of the cutter assembly 16 and secured to the frame 14. The portions of the shaft 20 inwardly of each end are mounted in mounting blocks 22 and are secured therein by means of a set screw 24. A sleeve 26, constituting a hub, is circumposed about and extends from one end to the other end of the shaft 20 with a stuffing box 28 at each end thereof sealing the space between the shaft 20 and the sleeve 26.

A plurality of hollow spokes 30, arranged in three sets with six spokes in each set, are arranged about and project radially from the sleeve 26 and have their inner ends threadedly engaged in spaced threaded holes provided in the sleeve 26. The spokes 30 in each of the three sets of spokes are in alignment and carry on their free ends a flat beater blade 32 which extends from one end to the other end of the sleeve 26. The portion of the shaft 20 contiguous to each set of spokes 30 is provided with an aperture as at 34 in Figures 3 and 4. The sleeve 26 is provided with a series of ports 36 connecting with the interior of each of the spokes 30 and registrable in turn with the aperture 34 when the sleeve 26 is rotated on the shaft 20.

The face of each of the beater blades 32 facing the cutter assembly 16 is provided with a plurality of egress openings arranged in spaced relation, as at 38 in Figures 6 and 7. Each of the openings 38 of each of the beater blades 32 is in communication with the interior of such blades 32 and the interior of each blade 32 is in communication with the interior of the supporting spokes 30.

Conduits 40, one on each side of the reel 12 provides means connecting the interior of the shaft 20 to a source of compressed air either carried by the harvester or mounted upon a separate machine and towed by the harvester, such source of air under pressure not being shown.

Preferably, the spokes 30 are secured to the sleeve 26 with a sealing means as at 42 in Figure 4 surrounding each spoke threaded portion. A disc is welded, as at 44 in Figures 3 and 4, to the sleeve 26 and the sets of spokes 30 are secured by means of U-bolts 46 to the disc 44.

In use, as the shaft 20 rotates in a direction which carries the beater blades 32 into the grain in the direction of the arrow in Figure 2 the ports 36 each in turn come into registry with the aperture 34 and a blast of air is directed into the grain, as shown in Figure 2, during the portion of the travel of each beater blade toward the cutter assembly 16. The aperture 34 in the shaft 20 tapers so that the air blast coming from the holes or openings in each beater blade 32 tapers off from one beater blade 32 as the air blast commences from the following beater blade 32. This results in blowing of the grain heads from the short stalks of grain over the teeth of the cutter assembly 16 and onto the header 10 without loss. When the stand of grain is normal the operator may use the reel 12 in the conventional manner without the addition of the compressed air blast, if desired.

While only a preferred embodiment of the present invention has been shown and described, other embodiments are contemplated and numerous changes and modifications may be made therein without departing from the spirit of the invention as set forth in the appended claim.

What is claimed is:

In a harvester, a mobile frame, a cutter assembly carried by said frame at a level above a ground surface for cutting standing grain, a hollow fixed shaft arranged forwardly of and above and extending from one end to the other end of said cutter assembly, a sleeve circumposed about and extending from one end to the other end of said shaft and rotatable about said shaft as an axis, a plurality of hollow spokes arranged about and projecting radially from said sleeve, a hollow beater blade extending the entire length of said sleeve and carried by each of the free ends of said spokes, the portion of said shaft contiguous to said spokes being provided with an aperture, said sleeve being provided with a port communicating with the interior of each spoke, said sleeve being rotatable in a direction toward said cutter assembly, said ports being registrable in turn with said shaft aperture upon execution of rotational movement of said sleeve, the face of each blade adjacent said cutter assembly being flat and provided with a plurality of egress openings arranged in spaced relation therealong, each of said openings of each of said blades being in communication with the interior of said blade, and means connecting said shaft to a source of compressed air so that as each blade executes its partial rotational travel from a point remote from said cutter assembly downwardly and toward said cutter assembly compressed air will be forcibly ejected from said egress openings on to the standing grain.

References Cited in the file of this patent

UNITED STATES PATENTS 1,365,503    Kocher _____ Jan. 11, 1921